US007383019B1

(12) United States Patent
Thorsted et al.

(10) Patent No.: US 7,383,019 B1
(45) Date of Patent: Jun. 3, 2008

(54) FIELD DATA COLLECTION AND RELAY STATION

(75) Inventors: Steve Thorsted, Freeport, FL (US); Eural Chestang, Panama City, FL (US); Scott Chandler, Panama City Beach, FL (US); Dave Silnutzer, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 781 days.

(21) Appl. No.: 10/965,015

(22) Filed: Oct. 15, 2004

(51) Int. Cl.
*H04Q 7/20* (2006.01)

(52) U.S. Cl. ............... 455/11.1; 455/426.1; 455/426.2; 455/445; 455/414.1; 455/414.4; 455/456.1; 455/456.5; 348/152; 348/153; 348/155; 348/14.01; 348/14.02; 340/501; 340/541; 340/825.36; 340/825.49; 340/515; 340/517; 340/539; 725/12; 725/10; 725/62

(58) Field of Classification Search ............... 455/11.1, 455/423, 424, 425, 67.11, 466, 414.1, 414.4, 455/410, 426.1, 426.2, 456.1, 456.5, 457, 455/25, 500, 517, 445, 66.1, 550.1, 575.1, 455/90.3, 575.8, 67.7; 348/14.01, 14.02, 348/143, 152, 153, 155, 156; 340/501, 545.2, 340/541, 572.1, 510, 575, 515, 825.36, 517, 340/825.49, 539, 905, 574; 342/385, 413, 342/407, 450, 463, 445; 725/121, 12, 10, 725/62

See application file for complete search history.

(56) References Cited

U.S. PATENT DOCUMENTS

| | | | | |
|---|---|---|---|---|
| 5,546,072 | A * | 8/1996 | Creuseremee et al. | 340/574 |
| 5,847,663 | A * | 12/1998 | Chasek | 340/905 |
| 2003/0174210 | A1* | 9/2003 | Vimpari et al. | 348/152 |
| 2006/0075450 | A1* | 4/2006 | Haas et al. | 725/121 |

* cited by examiner

*Primary Examiner*—Keith Ferguson
(74) *Attorney, Agent, or Firm*—James T. Shepherd

(57) ABSTRACT

A field data collection and relay station is equipped to receive sensor data from locations in a region. The station has directional antennas that are focused to transmit and receive energy in and from unique directions. The station establishes a wireless network in which the sensor data is formatted and distributed to one or more of the directional antennas. As a result, the sensor data is wirelessly transmitted in at least one unique direction.

18 Claims, 2 Drawing Sheets

FIELD DATA COLLECTION AND RELAY STATION

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to remote and unmanned data collection systems, and more particularly to a data collection and relay station that collects data from a variety of field sensors and relays the data wirelessly in specific direction(s) for pickup and re-transmission by other such stations whereby the totality of the stations define a network.

BACKGROUND OF THE INVENTION

Surveillance of a large area is typically carried out by aircraft flyovers and/or manned reconnaissance. However, this type of surveillance is costly, is not continuous, and can be dangerous when the area is either occupied by hostile forces or is environmentally hostile due to the presence of chemical, radiological or biological agents. Accordingly, it would be preferable for field surveillance to be carried out in an unmanned fashion by various "sensors" (e.g., cameras, acoustic sensors, temperature sensors, chemical/radiological/biological sensors, etc.) that can be placed/located in a field location.

In general, most situations will require a variety of different types of sensors in order to generate sufficient data for performance of complete surveillance. However, different types of sensors very often generate different data formats and protocols. Further, when a surveillance area is large, data collection issues arise when sensor cabling is required as such cabling becomes difficult or impossible. Even if a sensor is equipped with wireless transmission capabilities, transmission distances are relatively short (e.g., typically on the order of 1000-2000 feet) thereby rendering them useless when a large area must be reconnoitered.

SUMMARY OF THE INVENTION

Accordingly, it is an object of the present invention to provide an unmanned data collection and relay station.

Another object of the present invention is to provide a system that can collect data in a wireless fashion and re-transmit the data in a wireless and directive fashion.

Still another object of the present invention is to provide a data collection and relay station that can function as a node in a wirelessly coupled network of such stations.

Other objects and advantages of the present invention will become more obvious hereinafter in the specification and drawings.

In accordance with the present invention, a field data collection and relay station has an omni-directional antenna for receiving sensor data transmitted wirelessly from a location lying within a region approximately centered on the omni-directional antenna. The station also has directional antennas, each of which is focused to transmit/receive energy in/from a unique direction. A wireless network establishment means is coupled between the omni-directional antenna and the directional antennas for standardizing formats and protocol of the sensor data and for distributing the sensor data so standardized to at least one of the directional antennas. As a result, the sensor data is wirelessly transmitted in at least one unique direction.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
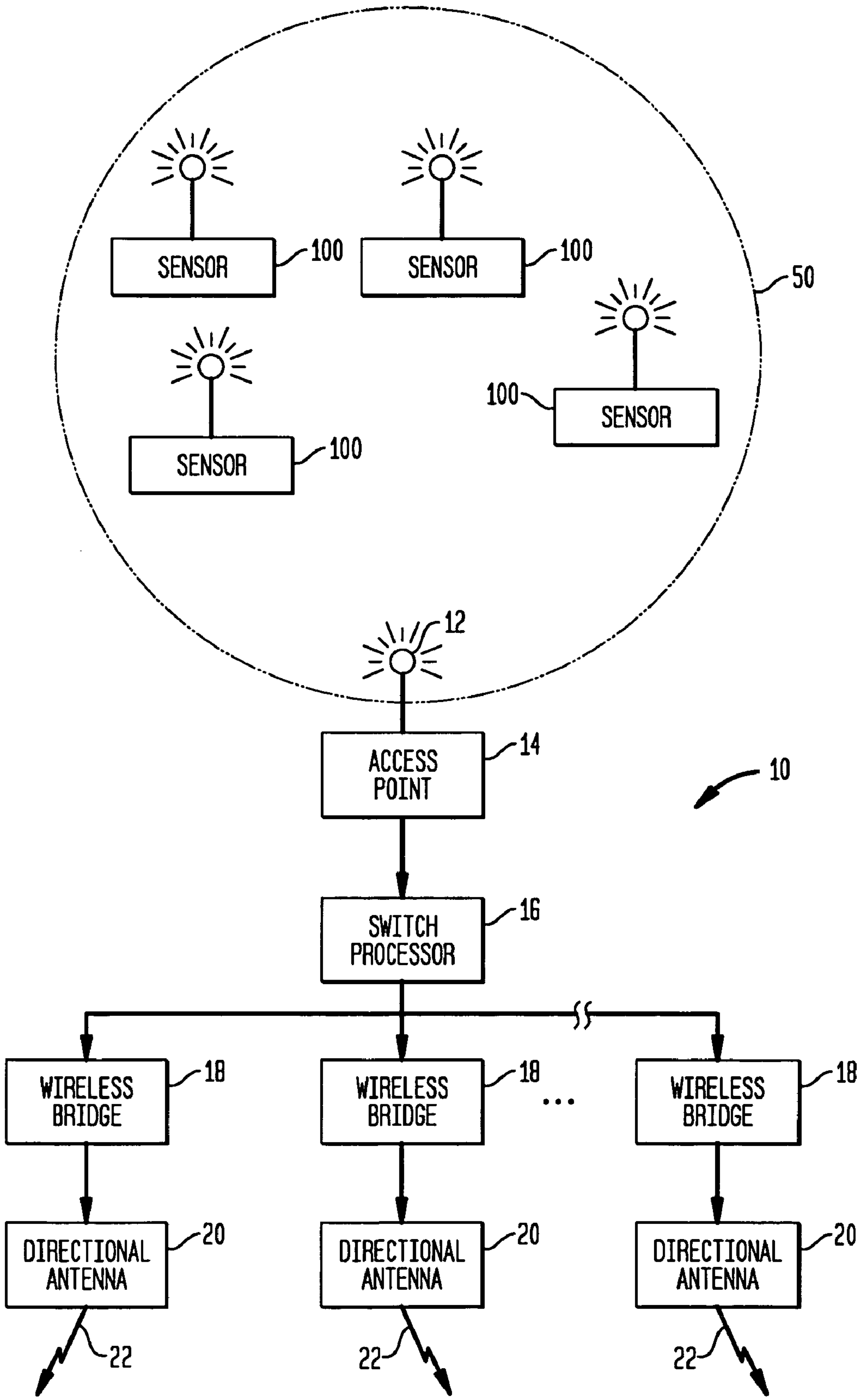
FIG. 1 is a block diagram of a field data collection and relay station in accordance with a first embodiment of the present invention.

Referring now to the drawings, and more particularly to FIG. 1, a block diagram of a field data collection and relay station is referenced generally by numeral 10. Data collection and relay station 10 is assumed to be placed in a field location where a number of sensors 100 have been placed. Sensors 100 can be the same type or different types depending on the application. For example, the sensors can be active or passive acoustic, vibration, temperature, chemical radiological, biological, etc., sensors without departing from the scope of the present invention. Each of sensors 100 is assumed to have the capability to wirelessly transmit its collected data. For example, each of sensors 100 can be "packaged" with or incorporate a wireless client adapter card (not shown) that formats data for wireless data transmission as is known in the art. Station 10 is equipped to collect the transmitted sensor data for all of sensors 100 within a radius of sensitivity of station 10.

Station 10 has an omni-directional antenna 12 for receiving data transmissions for each of sensors 100 that reside in a substantially circular region centered on antenna 12 and defined by dashed line 50. The radial size of region 50 is determined by local terrain and/or obstructions, but extend to radii on the order of one thousand feet. Coupled to antenna 12 is an access point device 14 that provides an entry point onto a wireless network for the data collected and transmitted by sensors 100. Access point 14 can be any device capable of performing the above-described function. By way of example, access point 14 can be a series 350 access point available from Cisco Systems.

Coupled to access point 14 is a switch processor 16 (e.g., an ethernet switch) that controls distribution of the sensor data received from access point 14. As used herein, distribution refers to the delivery of a particular sensor's data to one or more of station 10's wireless bridge 18 and corresponding directional antenna 20 combinations. Typically, each wireless bridge 18 is selected for compatibility with access point 14. Accordingly, by way of example, each wireless bridge 18 could be a series 350 wireless bridge available from Cisco Systems.

In general, each wireless bridge/directional antenna combination provides the means to wirelessly link station 10 with either another similar data collection and relay station (not shown) or a command center (not shown) on the wireless network to which station 10 belongs. More specifically, each wireless bridge/directional antenna combination is configured to transmit sensor data provided thereto (by switch processor 16) in a predetermined (i.e., preprogrammed) specified direction with each antenna 20 configured to focus its transmitted energy 22 in a unique direction. In this way, the various sensor data can be relayed in specific directions for further relaying or for ultimate use by a specific end user.

In cases where station 10 will be used to relay data, each one of antennas 20 that will serve as an intermediate relay point must also be able to receive wireless transmissions from a unique direction. Each such received wireless relay will then be distributed and re-transmitted by that particular station as controlled by that station's switch processor. To avoid cross-talk and/or data overlap, each wireless bridge/antenna combination can be programmed to transmit on a unique and non-overlapping frequency or channel. The number of bridge/antenna combinations utilized by station 10 can be varied based on the application and is, therefore, not a limitation of the present invention.

Figure 2:
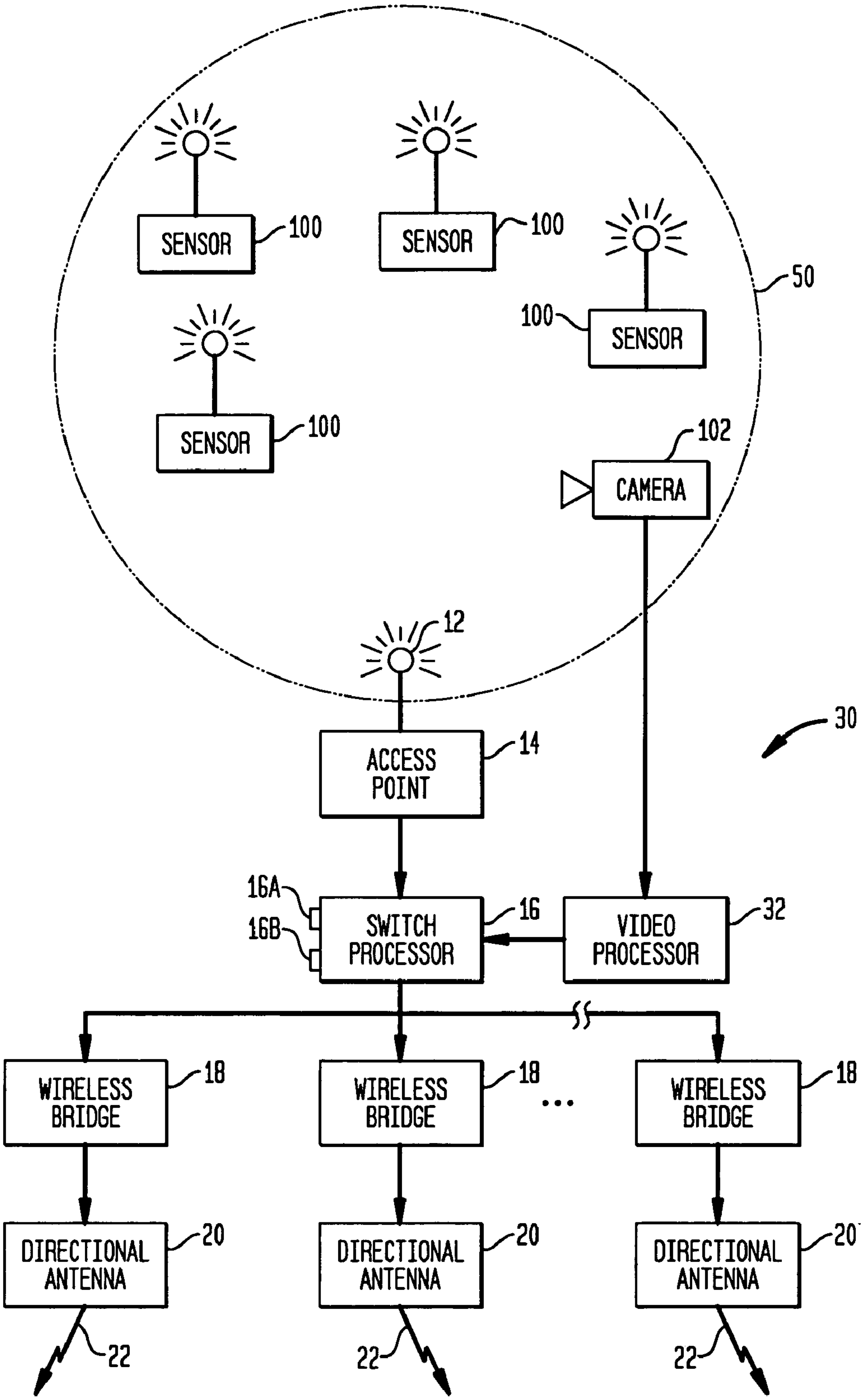
FIG. 2 is a block diagram of a second embodiment of a field data collection and relay station equipped to also receive a variety of sensory input signals in a hardwire fashion.

While station 10 is contemplated for use with sensors 100 that are equipped for wireless transmission, the present invention is not so limited. For example, FIG. 2 illustrates another embodiment of the data collection and relay station of the present invention that is referenced generally by numeral 30. Station 30 includes all of the elements of station 10 and further includes the capability to receive "sensor" data for sensors that are hardwired into station 30. For example, if video surveillance of some or all of region 50 is required, a video camera 102 could be hardwired into a video processor 32 that converts standard analog video signals (e.g., NTSC video signals) into a digital format suitable for efficient wireless transmission. One such digital format is the well known motion JPEG video stream or MJPEG. Video processor 32 is part of station 30 and is hardwired into switch processor 16. The video data can be distributed to the appropriate one(s) of the wireless bridge/directional antenna combinations by switch processor 16 as previously described.

Since it is also possible that station 30 may need to collect sensor data from other types of cabled sensors, switch processor 16 can have one or more ports 16A and 16B provided thereon for receiving various types of hardwire inputs. For example, port 16A is representative of one or more serial interface ports (e.g., RS232, RS422, etc.) and port 16B is representative of one or more ethernet interface ports (e.g., RJ-45 ethernet port) that allow station 30 to receive sensor inputs from sensors (not shown) that do not support any wireless interconnectivity. Once again, any hardwired sensor data received by switch processor 16 can be distributed to the appropriate one(s) of the wireless bridge/directional antenna combinations by switch processor 16 as previously described.

The advantages of the present invention are numerous. The data collection and relay station provides the hardware capability for the establishment of a wireless network in an area of surveillance. Once it is established, all "sensors" coupled to the station will have their data transmitted/relayed wirelessly to one or more stations on the network until the sensor data reaches its ultimate destination. The size of the surveillance area can be expanded merely by adding additional sensors and accompanying data collection and relay stations. Once an area is set up, surveillance can continue for an extended period of time without any manned intervention as data collection, distribution and relay is handled in a predetermined fashion as dictated by each station's switch processor.

Although the invention has been described relative to a specific embodiment thereof, there are numerous variations and modifications that will be readily apparent to those skilled in the art in light of the above teachings. For example, each station could be equipped to receive programming instructions via its omni-directional or directional antennas so that the on-board switch processor and/or wireless bridges could be reprogrammed from a remote location. It is therefore to be understood that, within the scope of the appended claims, the invention may be practiced other than as specifically described.

What is claimed as new and desired to be secured by Letters Patent of the United States is:

1. A field data collection and relay station, comprising:

a plurality of directional antennas, each of said plurality of directional antennas being focused to transmit energy in a unique direction;

a plurality of wireless bridges corresponding in number to said plurality of directional antennas, each of said plurality of wireless bridges coupled to one of said plurality of directional antennas;

a network access point;

an omni-directional antenna coupled to said access point adapted to receive sensor data transmitted wirelessly from a location lying within a region approximately centered on said omni-directional antenna, wherein said sensor data is passed to said access point; and switching means coupled between said plurality of wireless bridges and said access point for distributing said sensor data passed to said access point to at least one of said plurality of directional antennas through corresponding ones of said plurality of wireless bridges, wherein said sensor data is wirelessly transmitted in at least one said unique direction.

2. A field data collection and relay station as in claim 1 wherein said switching means comprises an ethernet switch.

3. A field data collection and relay station as in claim 1 further comprising a video processor coupled to said switching means for converting analog video signals supplied thereto to digital signals, wherein said digital signals are distributed by said switching means to at least one of said plurality of directional antennas through corresponding ones of said plurality of wireless bridges.

4. A field data collection and relay station as in claim 3 wherein said digital signals comprise motion JPEG video streams.

5. A field data collection and relay station as in claim 1 wherein said switching means includes at least one port for receiving additional sensor data in a hardwire fashion, wherein said additional sensor data is distributed by said switching means to at least one of said plurality of directional antennas through corresponding ones of said plurality of wireless bridges.

6. A field data collection and relay station as in claim 5 wherein said at least one port comprises at least one serial interface port and at least one ethernet interface port.

7. A field data collection and relay station, comprising:

an omni-directional antenna adapted to receive sensor data transmitted wirelessly from a location lying within a region approximately centered on said omni-directional antenna;

a plurality of directional antennas, each of said plurality of directional antennas being focused to transceive energy in a unique direction; and wireless network establishment means coupled between said omni-directional antenna and said plurality of directional antennas for distributing said sensor data to at least one of said plurality of directional antennas, wherein said sensor data is wirelessly transmitted in at least one said unique direction.

8. A field data collection and relay station as in claim 7 further comprising a video processor coupled to said wireless network establishment means for converting analog video signals supplied thereto to digital signals, wherein said digital signals are distributed to at least one of said plurality of directional antennas for wireless transmission therefrom.

9. A field data collection and relay station as in claim 8 wherein said digital signals comprise motion JPEG video streams.

10. A field data collection and relay station as in claim 7 wherein said wireless network establishment means includes at least one port for receiving additional sensor data in a hardwire fashion, wherein said additional sensor data is distributed to at least one of said plurality of directional antennas for wireless transmission therefrom.

11. A field data collection and relay station as in claim 10 wherein said at least one port comprises at least one serial interface port and at least one ethernet interface port.

12. A field data collection and relay station, comprising:

a plurality of directional antennas, each of said plurality of directional antennas being focused to transmit energy in a unique direction;

a plurality of wireless bridges corresponding in number to said plurality of directional antennas, each of said plurality of wireless bridges coupled to one of said plurality of directional antennas;

a network access point;

an omni-directional antenna coupled to said access point adapted to receive sensor data transmitted wirelessly from a location lying within a region approximately centered on said omni-directional antenna, wherein said sensor data is passed to said access point;

switching means coupled between said plurality of wireless bridges and said access point for distributing said sensor data passed to said access point to at least one of said plurality of directional antennas through corresponding ones of said plurality of wireless bridges, wherein said sensor data is wirelessly transmitted in at least one said unique direction;

said switching means further including at least one port for receiving additional sensor data in a hardwire fashion, wherein said additional sensor data is distributed by said switching means to at least one of said plurality of directional antennas through corresponding ones of said plurality of wireless bridges; and a video processor coupled to said switching means for converting analog video signals supplied thereto to digital signals, wherein said digital signals are distributed by said switching means to at least one of said plurality of directional antennas through corresponding ones of said plurality of wireless bridges.

13. A field data collection and relay station as in claim 12 wherein said switching means comprises an ethernet switch.

14. A field data collection and relay station as in claim 12 wherein said digital signals comprise motion JPEG video streams.

15. A field data collection and relay station as in claim 12 wherein said at least one port comprises at least one serial interface port and at least one ethernet interface port.

16. A field data collection and relay station, comprising:

an omni-directional antenna adapted to receive sensor data transmitted wirelessly from a location lying within a region approximately centered on said omni-directional antenna;

a plurality of directional antennas, each of said plurality of directional antennas being focused to transceive energy in a unique direction;

wireless network establishment means coupled between said omni-directional antenna and said plurality of directional antennas for distributing said sensor data to at least one of said plurality of directional antennas, wherein said sensor data is wirelessly transmitted in at least one said unique direction;

said wireless network establishment means further including at least one port for receiving additional sensor data in a hardwire fashion and for distributing said additional sensor data to at least one of said plurality of directional antennas for wireless transmission therefrom; and a video processor coupled to said wireless network establishment means for converting analog video signals supplied thereto to digital signals, wherein said digital signals are distributed by said wireless network establishment means to at least one of said plurality of directional antennas for wireless transmission therefrom.

17. A field data collection and relay station as in claim 16 wherein said digital signals comprise motion JPEG video streams.

18. A field data collection and relay station as in claim 16 wherein said at least one port comprises at least one serial interface port and at least one ethernet interface port.

* * * * *